Feb. 25, 1930.  R. P. DUNMIRE  1,748,547

CONDUIT BOX

Filed Feb. 16, 1926

INVENTOR.
Russell P. Dunmire
BY
ATTORNEYS.

Patented Feb. 25, 1930

1,748,547

UNITED STATES PATENT OFFICE

RUSSELL PAUL DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT BOX

Application filed February 16, 1926. Serial No. 88,565.

This invention is designed to improve conduit boxes, particularly the knock-out type of box. By means of this invention such a box is conveniently and efficiently adapted for receiving a conduit and preferably a threadless conduit. Features and details of the invention will appear from the specification and claim.

The invention is illustrated in the accompanying drawings as follows:—

Figure 1:
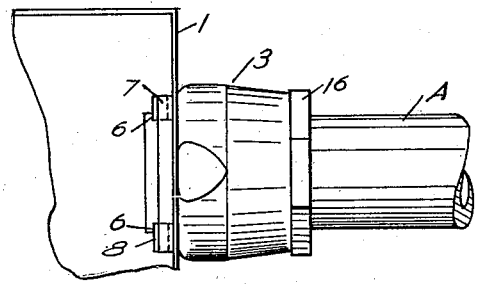

Fig. 1 shows a top view of the box.

Figure 2:
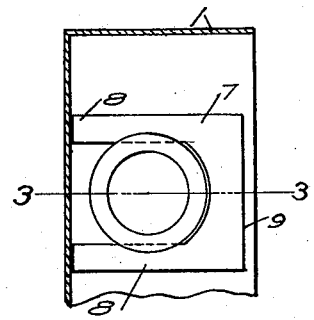

Fig. 2 an elevation of a conduit box wall giving an end view of the conduit receiving fitting.

Figure 3:
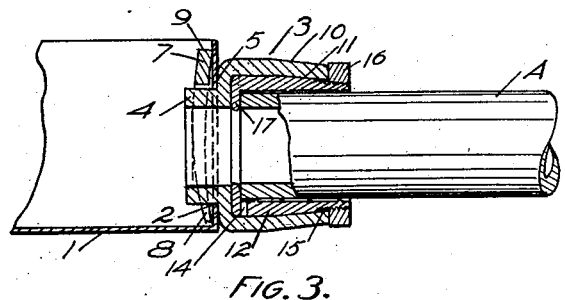

Fig. 3 a section on the line 3—3 in Fig. 2.

Figure 4:
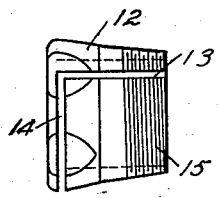

Fig. 4 a detached view of a contractible clamping sleeve.

1 marks a conduit box, and 2 a knock-out opening in the box.

A conduit-receiving fitting 3 has a projection 4 extending from a shoulder 5. The projection 4 extends through an opening 2 and is provided with laterally extending shoulders 6 at its inner end.

A wedge-piece 7 of U-shaped form has its branches 8 straddling the projection and extending under the shoulders 6. The branches are slightly curved and wedge-shaped so that the wedge may be driven into place under the shoulders and the resiliency of the wedge provides for some slight variation in the dimensions of the parts. The wedge action of the wedge piece 7 clamps the shoulder 5 against the face of the wall of the box and rigidly secures the fitting in the opening.

The upper edge 9 of the wedge piece is slightly below the edge of the box so that when the cover is in place on the box the accidental removal of the wedge is avoided.

An extension 10 projects from the shoulder 5 and has outwardly converging walls forming a tapered inner surface 11. A contractible sleeve 12 is arranged within the extension 10 and has a tapered surface conforming to the tapered surface 11. This sleeve has a longitudinal slot 13 terminating in a circumferential slot 14 rendering the sleeve readily contractible. The sleeve is provided with screw threads 15 at its outer end and a nut 16 is arranged on these screw threads and adapted to draw the sleeve into wedging engagement with the extension so as to contract the sleeve into clamping engagement with a conduit A. The sleeve has a projecting flange 17 which forms a guard over the end of the conduit.

The projection is provided with flat portions directly back of the shoulders 6, as clearly indicated by dotted lines in Fig. 2, which are engaged by the branches 8 of the U-shaped wedge thus locking the projection with the wedge and that the end of the wedge engages the wall of the box thus adding to the clamping action in locking the projection against rotation.

What I claim as new is:—

In a conduit box, the combination of a box wall having a conductor opening therein, said box wall having a wall projection thereon; a tubular conduit-receiving fitting having a projection extending through the opening, said projection terminating in a shoulder at its outer end which shoulder engages the outer face of the wall of the box, said projection having oppositely disposed laterally projecting lips at its inner end and an out-of-round portion adjacent to said lips; a U-shaped wedge piece straddling the projection and engaging the lips, said U-shaped piece engaging the out-of-round portion of the projection and locking the projection against turning in the U-piece and the U-piece extending into contact and engaging the wall projection preventing its rotation through the engagement of the U-piece with the wall projection; a fitting extension projecting outwardly from the shoulder; and means for securing a conduit in the extension.

In testimony whereof I have hereunto set my hand.

RUSSELL PAUL DUNMIRE.